June 2, 1970  F. E. WILSON  3,515,278

SEWAGE TREATMENT APPARATUS

Filed June 10, 1969

INVENTOR.
Frederick E. Wilson, Deceased
by Ruth L. Wilson, Executrix
BY
Christel & Bean
ATTORNEYS June 2, 1970 F. E. WILSON 3,515,278

SEWAGE TREATMENT APPARATUS

Filed June 10, 1969 2 Sheets-Sheet 2

INVENTOR.
Frederick E. Wilson, Deceased
by Ruth L. Wilson, Executrix
BY

Christel & Bean
ATTORNEYS

United States Patent Office 3,515,278
Patented June 2, 1970

3,515,278
SEWAGE TREATMENT APPARATUS
Frederick E. Wilson, deceased, late of Buffalo, N.Y., by Ruth L. Wilson, executrix, Buffalo, N.Y., assignor to Wilson Water Purification Corporation, Buffalo, N.Y.
Filed June 10, 1969, Ser. No. 831,843
Int. Cl. B01d 21/24, 23/20, 33/38
U.S. Cl. 210—109                    10 Claims

ABSTRACT OF THE DISCLOSURE

A sewage treatment apparatus comprising a tank having partition walls defining a straining and chlorinating chamber, a filter chamber, and a discharge chamber. Raw sewage is admitted into the tank and circulated successively through these chambers to yield a sterilized effluent. A liquid is flushed through the bottom of the various chambers from the rear to the front end of the tank to effect a backflow for cleaning the sludge and debris accumulated on the bottom of the series of chambers.

BACKGROUND OF THE INVENTION

This invention relates to the treatment and disposal of sewage and the like and, more particularly, to an apparatus for treating sewage and other wastes to yield a sterilized effluent of such a nature that it may be safely discharged into bodies of water without the hazard of pollution.

In recent years, sewage and waste disposal into streams and other bodies of water has become a very serious problem. There has been much industrial and governmental activity in this field to control waste disposal in order to minimize water pollution and thereby reduce the hazards of contamination.

One area which presents a particular problem is the disposal of waste from marine vessels. One shipboard practice employed is to utilize a simple holding tank or receptacle which is discharged in facilities provided for this purpose at marinas or other suitable vessel docking sites. When the holding tank is full, it is sometimes necessary to discharge the sewage from such tanks into the ambient water, preferably in open water. However, this is not always possible, particularly when these vessels are plying inland waterway systems, because of strict health and pollution regulations prescribed by government agencies governing the disposition of sewage. In any event, the discharge of raw sewage from these vessels results in contamination of the surrounding water and certainly contributes to pollution.

SUMMARY OF THE INVENTION

The apparatus of the present invention, as hereinafter described, provides a solution to the above problems by providing an improved sewage treatment apparatus, particularly adapted for use in vessels, which is simple and strong in construction, rugged and durable in use, and which treats sewage and other wastes to yield a sterilized effluent of such a nature that it may be safely discharged into bodies of water and conform to prescribed health standards.

Generally speaking, the sewage treatment apparatus of the present invention comprises a tank having a series of vertical partition walls defining a straining and chlorinating chamber, a macerating chamber, a retarding chamber, a filter chamber and a discharge chamber. Raw sewage is admitted into the tank and circulated successively through these chambers to yield a sterilized effluent which may be safely discharged into open water or soil. Means are provided for effecting a backflow through the bottom of the tank to flush the sludge which has settled to the bottom of the various chambers.

DESCRIPTION OF THE PREFERRED EMBODIMENT

Figure 1:
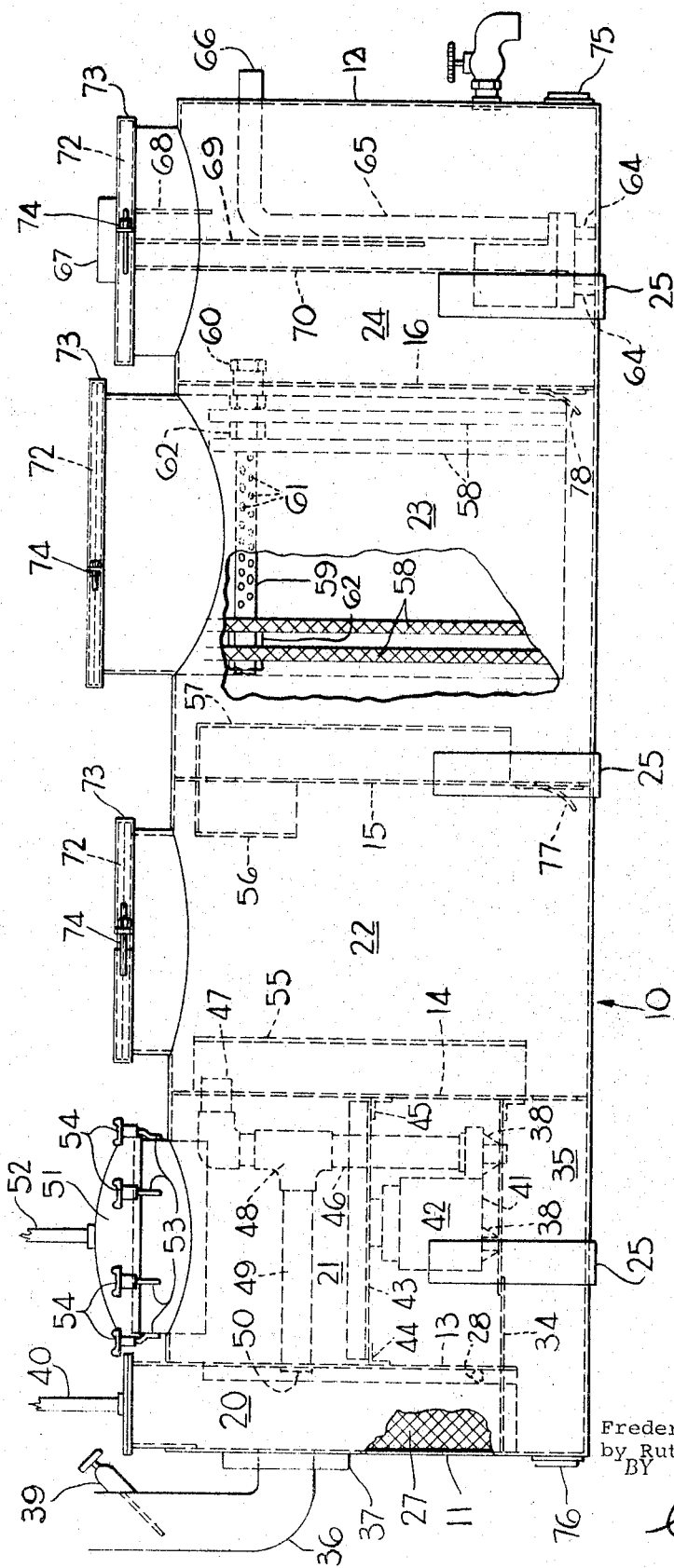
FIG. 1 is a side elevational view, partially in cross section, of one form of the sewage treatment apparatus of the present invention.

The apparatus illustrated in the accompanying drawings, referring particularly to FIG. 1, comprises a horizontally extending cylindrical tank, generally designated 10, having end walls 11 and 12 and a series of vertical partition walls designated, from left to right, 13, 14, 15 and 16. The aforesaid partition walls define, again from left to right in FIG. 1, a straining and chlorinating chamber 20, a macerating chamber 21, a retarding chamber 22, a filter chamber 23 and a discharge chamber 24. Passage means, in the form of box-like ducts and tubular conduits, hereinafter more fully described, are provided between adjacent chambers to permit communication therebetween. Cylindrical tank 10 is supported on a plurality of longitudinally spaced support members 25 of a generally U-shaped configuration, which support members 25 may be welded or otherwise fixedly secured to the bottom of tank 10.

Figure 2:
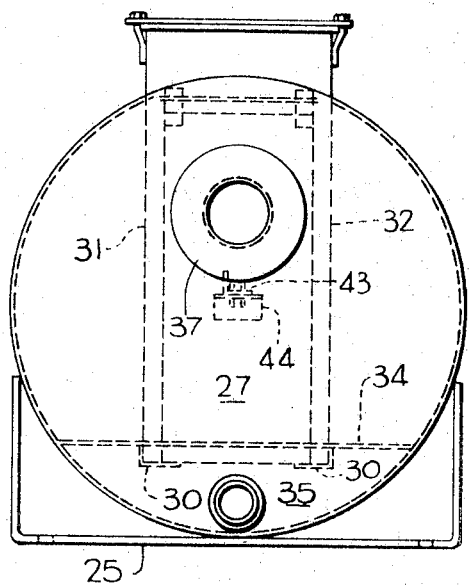
FIG. 2 is a front elevational view of the sewage treatment apparatus of FIG. 1.

A box-like strainer 27 of expanded metal or the like provides a relatively coarse screening structure and has its open side directed to the left, as viewed in FIG. 1, and seated against the interior of end wall 11. A rod 28 retains the strainer against wall 11 and the strainer rests upon angle members 30. Partition 13 is in the form of a vertical channel of rectangular cross-section, the side flanges of the channel, shown at 31 and 32 in FIG. 2, extend to the left as viewed in FIG. 1 from wall 13 to the interior of end wall 11. A horizontal partition wall 34 forms a chamber 35 below the chambers 20 and 21 and contains a rectangular opening shaped to receive the lower end of channel-shaped partition wall 13.

The terms top, bottom, left-hand, right-hand and the like, as used herein, are used only for convenience of description with reference to FIG. 1 and should not be taken as limiting the scope of this invention. The front or forward end of tank 10 will be taken to be the left-hand side of the tank as viewed in FIG. 1 for purposes of this description.

Sewage enters the interior of strainer 27 by way of a conduit 36 attached by means of a fitting 37 to end wall 11 and it will be seen that material entering the strainer may be strained through the top and bottom walls thereof, the two side walls, and also the right-hand side wall of the strainer in FIG. 1. This strainer is for the purpose of intercepting large articles such as rags and the like. The raw sewage is received at fitting 37 at a sufficiently high head to maintain tank 10 substantially filled with liquid.

A chlorine solution is fed into chamber 20 by way of a chlorinator of a known type (not shown) wherein chlorine pellets are dissolved in water and then fed to the conduit 40 at a controlled rate. The chlorine solution is mixed with the raw sewage which flows downwardly through the space between the right-hand wall of strainer 27 and partition 13 and through an opening provided in horizontal partition wall 34 and then upwardly through another opening in horizontal partition wall 34 and then upwardly through another opening in horizontal partition wall 34 which registers with an inlet 41 of macerator 42 of any known conventional design, whereby the raw sewage enters the macerator.

The macerator 42 is mounted on legs 38 which are supported on horizontal partition wall 34. An elongated angle bar 43 extends between partition walls 13 and 14 and is mounted on angle bars 44 and 45 secured to partition walls 13 and 14, respectively. Bar 43 engages the top of macerator 42 to hold the same against horizontal compartment wall 34. Macerator 42 reduces the chlorinated sewage into fine particles to improve its chemical treatment capabilities and produces thorough chlorination thereof. Macerator 42 is operated electrically by a suitable electrical circuit (not shown) activated by connections to a probe 39 located in inlet 36 which signals the presence of raw sewage in inlet 36.

An upwardly extending conduit 46 is connected to a discharge passage at the bottom of macerator 42 and terminates in a discharge outlet 47. A T-fitting 48 is tapped into conduit 46 and connects with a conduit 49 extending toward and through partition wall 13 and terminating in an outlet end 50 in close proximity to strainer 27. The macerated sewage product is fed through conduit 41 and expelled simultaneously through discharge outlet 47 and through conduit 49.

The sewage backflow through conduit 49 is directed against strainer 27 to flush the same and preclude clogging of strainer 27. As long as macerator 42 is pumping the sewage product through conduit 41, strainer 27 will be continuously flushed to maintain it in good operating condition. A removable dome cover 51 is provided at the upper end of chamber 21 for permitting access into such chamber, the cover being provided with a vent 52 and releasably secured onto the upper portion of chamber 21 by means of a plurality of bolts 53 and associated wing nuts 54.

The chlorinated sewage product expelled from discharge outlet 47 flows by gravity through a box-like channel duct 55 into the bottom of retarding chamber 22. Flow of the sewage product is maintained in retarding chamber 22 by the action of macerator 42. However, the forced upflow through chamber 22 is effective to cause the chlorine solution to adequately intermix with the sewage product and disinfect and sterilize the same. Thus, the flow through chamber 22 is retarded to provide sufficient time for the chlorine solution to chemically react with the sewage product and neutralize the same. Also, the heavier particles of the suspended sewage will tend to gravitate to the bottom of retarding chamber 22 and settle there as sludge.

The suspended matter flows from retarding chamber 22 by upward flow into a box-like conduit 56, through an opening in partition wall 15, and then downwardly through a box-like conduit 57 into filter chamber 23. A plurality of filter elements 58 of any suitable construction, are suspended from an elongated perforated tube 59 secured to and extending rearwardly from partition wall 16 by means of a suitable coupling 60 provided in an opening in partition wall 16.

Tube 59 is perforated as at 61 and is provided with a plurality of collars 62 sandwiched between and separating filter elements 58. These filter elements 58 are for the purpose of intercepting particles of a size which pass strainer 27 but are objectionally large. The foregoing filter element arrangement is conventional and well-known in the art and need not be described in further detail.

The filtered sewage passes into and through tube 59 and coupling 60 into discharge chamber 24 and is drawn into an inlet of an electrically operated educator or lift pump 63 supported on legs 64.

The resulting filtered sewage liquid is conveyod by pump 63 through a conduit 65 and discharged from the outlet 66 as a liquid effluent in a sterile condition. Operation of the lift pump 63 is governed by a control box 67 electrically connected thereto and having a series of probes 68, 69 and 70. When the sterilized fluid reaches a level in chamber 24 to contact probe 68, pump 63 will be started to discharge the fluid. When the level of the fluid is lowered below probe 69, pump 63 will stop until the fluid level again contacts probe 68. When the liquid level is dangerously low and drops below the lower end of probe 70, control box 67 is effective to open all the circuits of the system and stop operation of the entire system. Thus, probe 70 serves as an emergency device in the event of failure of other components of the system or when certain parts are blocked or when no sewage flows into inlet conduit 36 for a period of time to impede flow to the discharge chamber 24.

Chambers 22, 23 and 24 have open cylindrical upper ends which are closed by covers 72 as shown in FIG. 1. Covers 72 are retained closed by means of closure rings 73 having suitable bolt and nut fasteners, generally indicated at 74. If desired, vent pipes or openings leading to the atmosphere may be provided in each of the covers 72 to vent any excess air pressure in the associated chambers and also to relieve any partial vacuum that might be developed in these chambers.

When it is desired to clean and flush tank 10, water or any other suitable cleaning fluid is admitted through a normally closed opening 75 located at the outlet end of tank 10 adjacent the bottom thereof and flows through openings in partition walls 16, 15 and 14 through the bottom of chambers 24, 23, 22, and 35, to flush the accumulated sludge and debris which settles at the bottom of these chambers, thence outwardly through normally closed opening 76 located at the inlet end of tank 10. For this purpose flexible flap members 77 and 78 are provided adjacent the bottom openings in partition walls 15 and 16 to permit backflush flow therethrough but prevent flow of the sewage through said openings in the reverse direction, that is, toward the outlet end of the tank 10. If desired, drains may be provided at the bottom of tank 10 adjacent the partition walls to periodically remove sludge that has settled therein.

The present invention provides an apparatus for treating sewage in an improved and more efficient manner to yield a sterilized effluent free of any constituents which might harmfully contaminate a stream or other body of water and which meets contemporary health standards. It should be understood that this invention is not restricted in use to marine vessels but has utility in other environments on land where a compact sewage treatment unit is desired which will effect relatively complete sterilization of the effluent so that the final treated product may be discharged directly to the soil or open water without hazard of harmful contamination or pollution.

A preferred form of this invention having been described and illustrated in the drawings, it is to be understood that this has been done by way of illustration only.

What is claimed is:

1. An apparatus for treating sewage comprising: a tank having a sewage inlet at one end thereof and an outlet at its oposite end; a plurality of upright partitions in said tank defining a series of chambers through which sewage is successively circulated; passage means between each adjacent pair of said series of chambers; a strainer mounted in a first chamber adjacent said inlet end; means for admitting a mixture of raw sewage and water into said first chamber through said inlet; means for admitting a disinfecting chemical solution into said first chamber for admixture with and treatment of said raw sewage; a second chamber and means therein for reducing the chemically treated sewage and water into a liquid suspension; a third chamber for retarding the flow of said liquid suspension and producing an upflow thereof through said third chamber; a fourth chamber and means therein for filtering the solids from said liquid suspension; a fifth chamber and means therein for discharging the resulting liquid through said outlet as a sterilized effluent.

2. An apparatus according to claim 1 wherein said sewage reducing means includes a macerator having a pump for maintaining sewage flow through said tank.

3. An apparatus according to claim 2 including a first conduit connected at one end thereof to the discharge passage of said macerator and having an outlet at the other end thereof opening into said third chamber.

4. An apparatus according to claim 3 including a second conduit connected to said first conduit for conveying a portion of the liquified macerated sewage to said strainer for continuously flushing the same.

5. An apparatus according to claim 1 wherein said third chamber is provided with a conduit for receiving the sewage product from said second chamber and directing the same to the bottom of said third chamber; said third chamber retarding the flow of said sewage product for a sufficient time to enable said disinfecting chemical solution to react with said sewage product and neutralize the same.

6. An apparatus according to claim 1 wherein said filtering means comprises a plurality of filter bags suspended from a perforated tube mounted in said fourth chamber and discharging into an opening leading to said fifth chamber.

7. An apparatus according to claim 1 wherein said discharging means comprises a pump connected to a discharge conduit leading to said outlet.

8. An apparatus according to claim 7 including means responsive to the level of fluid in said fifth chamber for activating said discharging means pump.

9. An apparatus according to claim 1 including means for conveying liquid through the bottom of said tank from the outlet end thereof to the inlet end for flushing the sludge and debris accumulated adjacent the bottom of said several chambers.

10. An apparatus according to claim 9 wherein the partitions at opposite sides of said fourth chamber are provided with flap valves at their lower portions to permit backflow of flushing liquid from the fifth chamber toward said first chamber and prevent flow of liquified sewage therethrough in a direction opposite to said backflow.

References Cited

UNITED STATES PATENTS 3,419,146   12/1968   Koulovatos _____ 210—199 X

JAMES L. DECESARE, Primary Examiner

U.S. Cl. X.R.

210—136, 152, 202, 258, 295